Patented June 18, 1929.

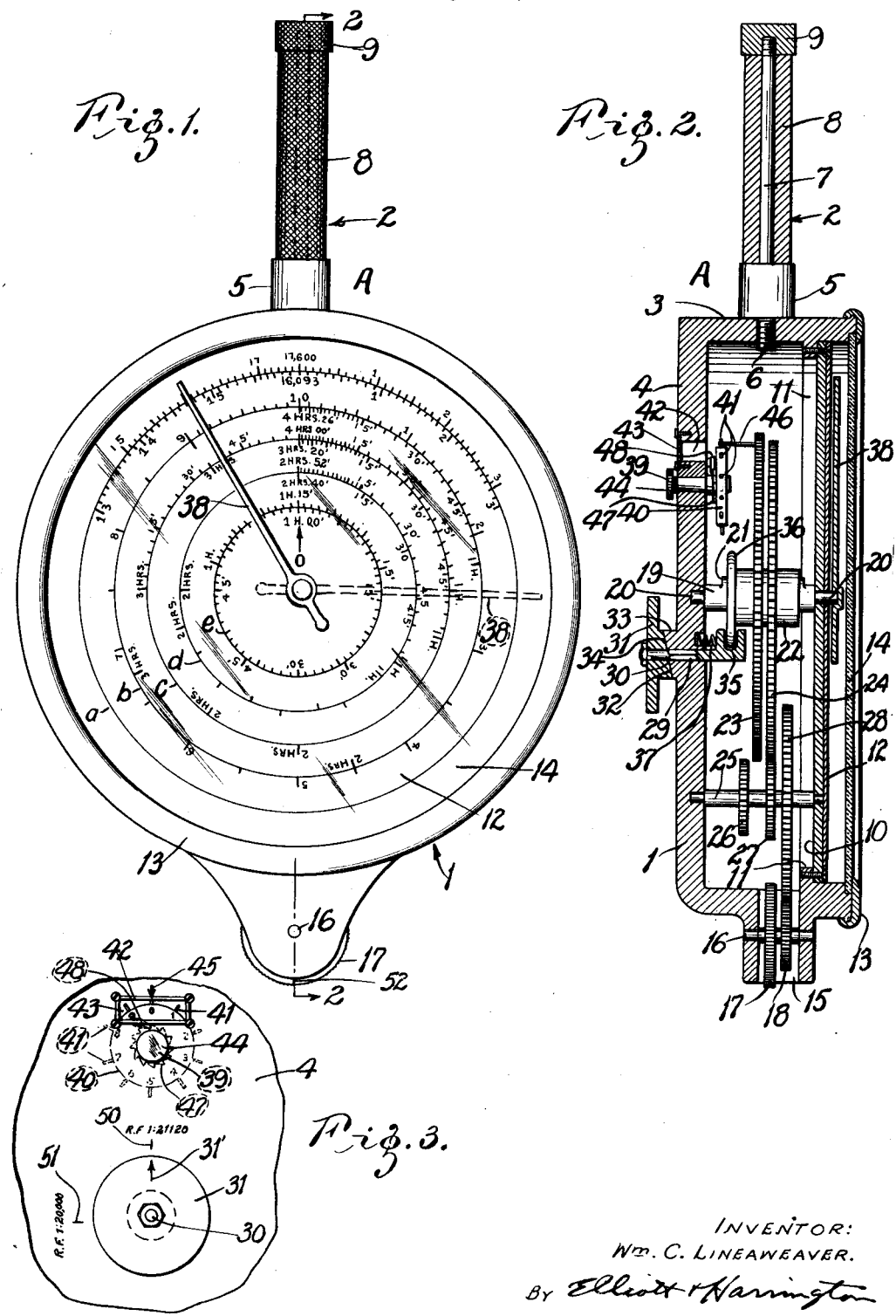

1,718,052

UNITED STATES PATENT OFFICE.

WILLIAM C. LINEAWEAVER, OF ST. LOUIS, MISSOURI.

MEASURING DEVICE.

Application filed April 4, 1927. Serial No. 180,726.

This invention relates generally to measuring devices, and particularly to an improved measuring device by means of which distances between predetermined points indicated on a map may be determined in yards, meters, and miles, and which will operate also to indicate the approximate amount of time that would be consumed in traveling at a fixed rate of speed between points indicated on a map.

In preparing for a journey between distant points, officers of military and other organizations ordinarily will procure a map for the purpose of selecting the roads over which the organizations will pass. The maps are usually drawn to a predetermined scale of a certain number of inches to the mile, but in a very great majority of cases, the roads are not sufficiently straight to permit the distance between points on said road as indicated on the map to be calculated with the aid of a rule or a similar straight-edge measuring device arranged parallel with said road. It is, therefore, the purpose of this invention to provide a measuring device with the aid of which the exact distance between points on the ground may be determined from a representation of said road on a map, even though said road be ever so devious.

An object of the invention, in addition to aiding in calculating distances between points, is to aid in determining the amount of time required for persons, animals, and vehicles to travel between points indicated on a map when said persons, animals and vehicles travel at a predetermined and uniform rate of speed. For instance, in the case of movement of military organizations, although the device is not limited to this particular use, my improved measuring device will indicate (1) the distance between the points from and to which the organizations will travel; and (2) the time which will be consumed in traveling between said points by (a) infantry; (b) cavalry and field artillery; and (c) motor trains; which organizations, of course, travel at different rates of speed. The device is of equal value to pedestrians and automobile tourists where a uniform speed of travel is maintained.

Figure 1 is a front elevation of my improved measuring device;

Figure 2 is a vertical section on line 2—2 of Fig. 1;

Figure 3 is a fragmentary elevation looking at the rear wall of the device.

In the drawing, which illustrates one embodiment of my invention, A designates the improved measuring device which comprises a body portion 1 in the form of a housing provided with a handle 2. The housing 1 is circular in elevation, comprising a circumferential wall 3 and a rear wall 4, and the handle 2 comprises a member 5 having a threaded stem 6 which is screwed into an opening in the circumferential wall 3 of the body portion 1, and a spindle 7 on which a cylindrical grip 8 is mounted, said handle including a nut 9 which is screwed on the outer end of the spindle 7, whereby the grip 8 may be held rigid on said spindle or be permitted to rotate thereon. The front wall of the body portion 1 is produced by a disk 10 which is secured by means of screws or other fastening devices to an annular flange 11 forming part of the housing 1. Secured to the outer face of the disk 10 is a dial 12 which is printed in a manner to be hereinafter described, and spaced from said dial and rigidly secured in place by means of a suitable circular gripping device 13 is a transparent wall or lens 14.

At the side thereof opposite to the side at which the handle 2 is located, the housing 1 is provided with a rectangular opening 15 produced by downwardly extended front, back and end walls, and arranged transversely through the opening 15 is a shaft 16 which is supported for rotation by the oppositely disposed front and rear walls of said opening, as shown clearly in Fig. 2. Mounted on the shaft 16 is a disk 17 provided with a knurled circumferential edge, said disk being of such diameter that it extends a slight distance below the lowermost edges of the walls surrounding the opening 15. 18 designates a pinion which is rigidly mounted on the shaft 16 so that it will rotate therewith.

Arranged transversely of the housing 1 at the approximate center thereof is a shaft 19 having reduced portions 20 at its opposite ends, which portions are mounted for rotation in the rear wall 4 of the housing 1 and the disk 10, respectively, and said shaft is provided with a longitudinal extension 21 in the form of a key. Mounted on the shaft 19 is a hub 22 having a key-way formed therein into which the extension 21 extends, whereby said hub may move longitudinally of the shaft 19, and fixed to said hub is a pair of spaced gear wheels 23 and 24; the gear wheel 23 is of slightly greater diameter than the gear wheel 24, as shown in Fig.

2, and because said gear wheels are fixed to the hub 22, it is plain that they will move with said hub when it is moved longitudinally of the shaft 19. Arranged parallel with the shaft 19 at a point below same is a shaft 25 which is also provided with reduced portions at its opposite ends and is supported for rotation by the rear wall 4 of the housing and the disk 10. Rigidly mounted on the shaft 25 is a gear wheel 26 with which the gear wheel 23 is adapted to mesh, and a gear wheel 27 with which the gear wheel 24 is adapted to mesh; also a gear wheel 28, larger in diameter than the gear wheels 26 and 27, is rigidly mounted on the shaft 25, and said gear wheel 28 meshes with the pinion 18 already referred to.

Mounted for sliding movement in an opening 29 formed through the rear wall 4 of the housing 1 is a rod 30, the portion of said rod which is located within the opening 29 being non-circular in cross-section, and said opening having a corresponding shape so that said rod is prevented from rotating. The outer portion of the rod 30 is circular in cross-section, as indicated by the shading on said rod in Fig. 2, and mounted for rotation on said circular portion of said rod is a disk 31 having a hub portion provided with a cam face 32 at its inner end. The rear wall 4 of the housing 1 is provided with a boss 33 which surrounds the opening through which the rod 30 extends, and the outer end of this boss is provided with a cam face 34 which corresponds to the cam face 32 on the hub portion of the disk 31, and said cam faces 32 and 34 are in contact with each other. The rod 30 is provided with a nut at its outer end to prevent the disk 31 from being displaced therefrom, and said rod has a bifurcated inner end portion 35 which embraces an annular flange 36 formed on the hub 22. Also, the rod 30 is urged inwardly by a coil spring 37 which is interposed between the bifurcated portion of said rod and the rear wall of the housing 1. The shaft 19 on which the hub 22 is slidably mounted is provided at the end thereof which extends through the disk 10 and dial 12 with an indicator 38 which is adapted to be moved relative to the printed graduations on said dial in a manner and for a purpose to be hereinafter set forth.

Mounted for rotation in an opening formed through the rear wall 4 of the housing 1 is a shaft 39 on the inner end of which a disk 40 is rigidly mounted. The disk 40 is provided with a plurality of radial pins 41 spaced equidistant around the circumferential face thereof, and said disk is also provided with a series of numerals arranged on the face thereof, which is located adjacent to the inner face of the wall 4. The numerals referred to are extended consecutively from zero to nine, inclusive, in spaced relation on the disk 40, and the wall 4 of the housing is provided with a sight opening 42 covered by a transparent sheet 43 through which the numerals at the upper part of the disk may be seen. 44 designates a knurled thumb disk which is rigidly secured to the shaft 39 at its outer end so that said shaft may be rotated to return the disk 40 to the zero position, in which position the zero on the disk will be located immediately adjacent to the indication 45 on the rear wall of the housing immediately above the sight opening 42 (Fig. 3). 46 designates a pin which is secured to the gear wheel 23 and which is adapted to contact with the radial pins 41 on the disk 40, whereby said disk will be rotated a distance equal to the space between an adjacent pair of pins 41 each time the gear wheel 23 makes a complete revolution. To prevent movement of the disk 40 in a direction reverse to its normal direction of travel, I provide the hub portion of said disk with notches providing shoulders 47 and I arrange a pivotally supported spring-actuated detent 48 in such position that its free end will engage said shoulders and prevent reverse movement of the disk.

The dial 12 of my improved measuring device is provided with a plurality of printed circles which, in Fig. 1, are designated by the reference characters $a$, $b$, $c$, $d$, and $e$, respectively, and extended outwardly from the circle $a$ is a plurality of spaced graduations which divide said circle into divisions each of which represents 100 yards, the entire distance around the circle $a$ being divided by these graduations into 17,600 yards, or ten miles. Extended inward from the circle $a$ is a plurality of spaced graduations which divide the circle into divisions indicating meters, each division representing 100 meters and the entire circle being divided into 16,093 meters, which represents ten miles. The circle $b$ has outwardly extended graduations associated with it which divide said circle into miles, each division representing one-tenth of a mile, and the entire circle representing ten miles. Also, the circle $b$ is provided with inwardly extended graduations which represent divisions of time, the entire circle being divided to represent four hours and twenty-six minutes, and each division representing one minute. Likewise, the circles $c$, $d$, and $e$ each have outwardly and inwardly extended graduations in spaced relation associated therewith which divide the circles into divisions of time, the entire circle of outwardly extended graduations of the circle $c$ representing four hours; the entire circle of inwardly extended graduations associated with the circle $c$ representing three hours and twenty minutes; the entire circle of outwardly extended graduations associated with the circle $d$ representing two hours and fifty-two minutes; the inwardly extended graduations associated with said circle $d$ representing two hours and forty minutes; the entire circle of outwardly extended graduations associated with the circle *e* representing one hour and fifteen minutes; and the entire circle of inwardly extended graduations associated with said circle *e* representing one hour. All of the divisions of the graduations associated with the circles *c*, *d*, and *e* and the inwardly extended graduations associated with the circle *b* represent each one minute.

In the use of my improved measuring device, it will be assumed that a journey is to be made by military organizations made up of infantry, cavalry and field artillery, and motor trains, from point X to point Y indicated on a map drawn to a scale of three inches to the mile, and that the distance between these points is unknown, and therefore, my improved measuring device is to be used to determine this distance and also to learn how much time will be consumed by the various organizations in making the journey. The nut 9 at the outer end of the handle 2 will be unscrewed slightly so that the body portion 1 of the instrument may rotate relative to the grip 8 of the handle, and the instrument will be arranged so that the knurled disk or tracer wheel 17 is at the point X on the map and with the indicator 38 at the zero position. The instrument will then be moved so that the tracer wheel 17 will traverse the road between the points X and Y, and because of the weight of the instrument, just enough pressure will be applied to the map by the tracer wheel 17 to cause said tracer wheel to rotate as the instrument is moved along the road. If it be assumed now that it is found on examining the dial of the instrument after said instrument has been moved between the points X and Y as described, that the indicator 38 is in the position in which it is shown by dotted lines in Fig. 1 and that the numeral "2" on the numbered disk 40 is alined with the indicator 45 above the sight opening 42 adjacent to said disk, it will be known that the distance between X and Y is twenty-two and a half miles, as the position of the numbered disk 40 will indicate that the indicator 38 made two complete revolutions which represents twenty miles, and in addition, said indicator moved one-fourth of the distance around the dial to the two and one-half mile mark associated with the circle *b*. Also, the position of the indicator 38 and the numbered disk 40 will indicate that the distance between the points measured is 39,600 yards, or 36,209 meters.

Considering now the amount of time required for the different military organizations to make the journey, the user of the instrument may learn by referring to the circle *e* that the motor train, which travels at a rate of speed of approximately ten miles an hour, will consume two hours and fifteen minutes in making the journey; while the infantry, which is traveling at a rate of speed of approximately two and one-half miles an hour, will consume nine hours in making the journey. In like manner, the speed of each organization may be determined by considering the position of the indicator 38 with respect to the circle of graduations which are spaced in proportion to the rate of speed at which the particular organization is to travel, and by referring also to the position of the numbered disk 40. These calculations will be rendered simple by the fact that an instruction sheet will accompany the instrument which will advise the user that certain circles of graduations are to be considered when a certain rate of speed of travel is to be attained. For instance, this instruction sheet will advise that when the speed of travel is to be at the rate of two and one-fourth miles per hour, the position of the indicator 38 after the measuring operation is to be considered with relation to the circle of graduations extending inwardly from the circle *b*; when the speed of travel is at the rate of two and one-half miles per hour, the position of the indicator is to be considered with respect to the circle of graduations extended outwardly from the circle *c*; and that when the speed of travel is at the rate of three, three and one-half, three and three-fourths, eight, and ten miles per hour, the position of the indicator 38 will be considered with respect to the inwardly and outwardly extended circles of graduations associated with the circles *d* and *e*, respectively. It is plain, therefore, that when the proposed rate of speed of travel is known, it will be a simple matter to determine the length of time required to make the journey by referring to the position of the indicator 38 with respect to the proper circle of graduations.

It will be noted by referring to Fig. 3 that the disk 31 is provided with an indication 31′ and also that the rear wall 4 of the body portion of the instrument is provided with a mark 50 and a mark 51. A great number of military maps are made on a scale of R.F.1:21120, which means that one inch on the map represents 21,120 inches on the ground, or, with respect to miles, the map is drawn on a scale of three inches to the mile. When my improved instrument is to be used in connection with a map made on this scale, it is only necessary to set the disk 31 so that the indication 31′ is alined with the mark 50, and with the disk positioned as described, the elements within the housing 1 will be positioned as shown in Fig. 2; that is to say, the gear wheel 24 will be in mesh with the gear wheel 27, and when the tracer wheel 17 is moved along the road to be measured, the actual distance between the points on the ground will be indicated by the indicator 38. If, however, the map were drawn on a scale of, for instance, six inches to the mile, the user of the instrument would be compelled to divide the total indicated by the instrument in half, and if the map were drawn on a scale of one and one-half inches to the mile, the total indicated by the instrument would be multiplied by two to obtain the distance on the ground between the points measured on the map. Also, many military maps are drawn on the scale of R.F.1:20000, which means that one inch on the map represents 20,000 inches on the ground, and when a map drawn to this scale is being measured with the aid of my improved instrument, the disk 31 is moved to a position where the indication 31' is alined with the mark 51. When the disk 31 is moved from the position where the indication 31' is alined with the mark 50 to the position where said indication is alined with the mark 51, the movement of the cam face 32 at the hub portion of the disk 31 rotating with respect to the cam face 32 on the boss 33 will cause the shifting rod 30 to be moved outwardly, whereby the gear wheel 24 will be moved out of mesh with the gear wheel 27, and the gear wheel 23 will be moved into mesh with the gear wheel 26. The gear wheel 23 is larger in diameter and has a greater number of teeth than the gear wheel 24, and also the gear wheel 26 with which said gear wheel 23 meshes is smaller in diameter and has fewer teeth than the gear wheel 27. Hence, a predetermined movement of the tracer wheel 17 will impart less movement to the indicator 38 when the gear wheels 23 and 26 are in mesh than it does when the gear wheels 24 and 27 are in mesh. When the map to be measured is drawn on a scale of R.F.1:20000, it is plain that all that need be done is to turn the disk 31 to a point where the indication 31' thereof is alined with the mark 51, when the map may be measured as already described. Here again it will be necessary, however, when the map is drawn to a scale other than R.F.1:20000, for the user of the device to multiply or divide the total shown on the dial of the instrument in accordance with the relation that the scale of the map being measured bears to R.F.1:20000; for instance, if the map being measured is drawn to the scale of R.F.1:10000, the totals shown by the instrument will be divided by two, and if the map being measured is drawn to a scale of R.F.1:40000, the totals shown by the instrument will be multiplied by two.

It is plain, therefore, that the device is intended for measuring maps drawn to two scales in very common use and on which a majority of maps are drawn, and when maps drawn on these scales are measured, no other calculations are necessary, it only being necessary to take the totals from the dial of the instrument. When, however, the maps being measured are drawn to scales other than those for which the instrument is intended, it may be successfully used by merely making a few simple calculations.

After the device has been used and it is desired to return the parts thereof to the zero positions, the knurled thumb disk 44 on the shaft 39 is rotated to return the disk 40 to the zero position, after which the tracer wheel 17 may be rotated by drawing it along the hand of the user until the indicator is at the zero position.

I prefer to arrange a graduation 52 on the tracer wheel 17 which will indicate the part of the tracer wheel which is to be brought into contact with the starting point on the map at the beginning of a measuring operation. At the beginning of a measuring operation, the indication 52 on the tracer wheel 17 is brought to a position where it is in alinement with the vertically arranged indicator 38, which at this time is in the zero position, and if the instrument is held so that a perpendicular line will pass through the indication 52 and extend longitudinally of the indicator 38, the instrument will be in its proper position.

I claim:

1. A measuring device for determining linear measurements on scale-drawn maps, comprising a body portion having a dial, an indicator movable with respect to said dial, a tracer wheel, and gear wheels whereby motion is transmitted from said tracer wheel to said indicator, certain of said gear wheels being proportioned with reference to different predetermined map scales and being shiftable into and out of engagement with other gear wheels to prepare the device for use in determining linear measurements on maps drawn to different scales, said shiftable gear wheels being of different diameters whereby the distance which will be traveled by the indicator during a fixed distance of travel of said tracer wheel may be varied, and said shiftable gear wheels being mounted for rotation in fixed locations with respect to said body portion.

2. A measuring device for determining linear measurements on scale-drawn maps, comprising a body portion having a dial, an indicator movable with respect to said dial, a tracer wheel, gear wheels whereby motion is transmitted from said tracer wheel to said indicator, certain of said gear wheels being proportioned with reference to different predetermined map scales and being shiftable into and out of engagement with other gear wheels to prepare the device for use in determining linear measurements on maps drawn to different scales, said shiftable gear wheels being of different diameters, whereby the distance which will be traveled by the indicator during a fixed distance of travel of said tracer wheel may be varied and said shiftable gear wheels being mounted for rotation in fixed locations with respect to said body portion, and means co-operating with said shiftable gear wheels whereby same may be shifted.

3. A measuring device for determining linear measurements on scale-drawn maps, comprising a body portion having a dial, an indicator movable with respect to said dial, a tracer wheel, gear wheels whereby motion is transmitted from said tracer wheel to said indicator, certain of said gear wheels being proportioned with reference to different predetermined map scales and being shiftable into and out of engagement with other gear wheels to prepare the device for use in determining linear measurements on maps drawn to different scales, said shiftable gear wheels being of different diameters whereby the distance which will be traveled by the indicator during a fixed distance of travel of said tracer wheel may be varied, and means co-operating with said shiftable gear wheels whereby same may be shifted, said means comprising a slidably mounted element and elements associated with said slidably mounted element and provided with cam faces whereby movement may be imparted to said slidably mounted element.

4. A measuring device for determining linear measurements on scale-drawn maps, comprising a body portion having a dial, an indicator movable with respect to said dial, a shaft on which said indicator is mounted, a plurality of gear wheels mounted on said shaft and adapted for longitudinal movement with respect thereto, said gear wheels being proportioned with reference to different predetermined map scales, a tracer wheel, gear wheels adapted to transmit motion from said tracer wheel to the gear wheels on said indicator shaft, and means for shifting the gear wheels on said indicator shaft longitudinally thereof and with respect to gear wheels of the train of gear wheels by which motion is transmitted from the tracer wheel to the gear wheels on the indicator shaft to prepare the device for use in determining linear measurements on maps drawn to difference scales, the first mentioned gear wheels being of different diameters whereby the distance which will be traveled by the indicator during a fixed distance of travel of said tracer wheel may be varied.

5. A measuring device for determining linear measurements on scale-drawn maps, comprising a body portion having a dial, an indicator movable with respect to said dial, a shaft on which said indicator is mounted, a plurality of gear wheels mounted on said shaft and adapted for longitudinal movement with respect thereto, said gear wheels being proportioned with reference to different predetermined map scales, a tracer wheel, gear wheels adapted to transmit motion from said tracer wheel to the gear wheels on said indicator shaft, means for shifting the gear wheels on said indicator shaft longitudinally thereof and with respect to gear wheels of the train of gear wheels by which motion is transmitted from the tracer wheel to the gear wheels on the indicator shaft to prepare the device for use in determining linear measurements on maps drawn to different scales, the first mentioned gear wheels being of different diameters whereby the distance which will be traveled by the indicator during a fixed distance of travel of said tracer wheel may be varied, and a rotatably supported numbered element provided with projections and adapted to indicate the number of complete revolutions of said indicator, one of the gear wheels on said indicator shaft being provided with a projection adapted to engage the projections on said rotatably supported numbered element, whereby the position of same is changed after each complete revolution of the indicator.

6. A measuring device for determining linear measurements on scale-drawn maps, comprising a housing having a dial, an indicator movable with respect to said dial, a tracer wheel, gears adapted to transmit motion from said tracer wheel to said indicator, said gears being proportioned with reference to predetermined map scales, and a handle secured to said housing, said handle being provided with a grip rotatable with respect to the handle whereby the tracer wheel may be caused to follow a devious path while the grip of the handle is held rigidly by the hand of the operator.

In testimony whereof, I have hereunto set my hand.

WILLIAM C. LINEAWEAVER.